United States Patent Office 3,135,770
Patented June 2, 1964

---

3,135,770
N-ALKYL AND N-ARALKYL-3-PHENYL-3-(o-HYDROXYPHENYL)-2-TETRAHYDRO-FURANONEIMINES
Harold Elmer Zaugg, Lake Forest, Robert William De Net, Waukegan, and Raymond John Michaels, Jr., Mundelein, Ill., assignors to Abbott Laboratories, North Chicago, Ill., a corporation of Illinois
No Drawing. Filed Nov. 5, 1962, Ser. No. 235,508
13 Claims. (Cl. 260—347.7)

This invention relates to new compounds in the formula

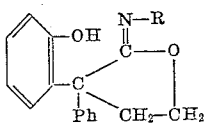

and methods for their preparation. In this and succeeding formulas, Ph is phenyl and R is loweralkyl containing from 1 to 4 carbon atoms, cycloalkyl containing from 3 to 6 carbon atoms, benzyl or β-phenylisopropyl. These compounds are useful as analgesics and hypotensive agents and can be employed orally, intravenously or intramuscularly per se or admixed with a non-toxic, pharmaceutical, liquid or solid carrier and administered in the form of tablets, solutions, suspensions or emulsions. In a representative operation, an intravenous injection of an aqueous saline solution of N-cyclopropyl-3-phenyl-3-(o-hydroxyphenyl)-2-tetrahydrofuranoneimine in cats at a dosage of 25 mg. per kg. of body weight produced an immediate marked drop in blood pressure.

These compounds are prepared by the reaction of a 3-(β-haloethyl)-3-phenyl-2-benzofuranone of the formula

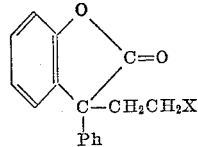

wherein X is chlorine or bromine with an amine having the formula R—NH₂. The reaction may be carried out in the absence of a solvent provided a stoichiometric excess of the amine is employed as the hydrohalide acceptor. In a preferred method of operation, a solution of one molecular proportion of the bromide and at least two molecular proportions of the amine in an inert, organic solvent such as cyclohexane, benzene, ethyl ether, tetrahydrofuran or acetonitrile is allowed to stand at room temperature for 2 to 6 days. The aminehydrohalide which forms is then removed by filtration and the filtrate is extracted with a dilute, aqueous acid solution. The aqueous acid layer is separated and made alkaline to precipitate the desired product which is removed by filtration and crystallized from a suitable organic solvent such as ethanol.

The following examples illustrate the invention but should not be construed as the sole embodiments thereof.

EXAMPLE 1

*N-Cyclopropyl-3-Phenyl-3(o-Hydroxyphenyl)-2-Tetrahydrofuranoneimine*

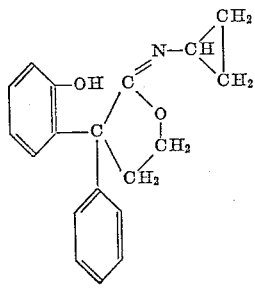

A solution of 15.9 grams (0.05 mole) of 3-(β-bromoethyl)-3-phenyl-2-benzofuranone and 6.3 grams (0.11 mole) of cyclopropylamine in 100 ml. of dry benzene was allowed to stand at room temperature for 6 days. The cyclopropylamine hydrobromide which formed was removed by filtration and washed with ether. The combined filtrate and ether washings were extracted with two 50 ml. portions of 10% aqueous sulfuric acid and the aqueous acid extract was made alkaline by the careful addition of a 40% aqueous sodium hydroxide solution. The solid product which precipitated was filtered, dried and recrystallized from ethanol. M.P.=130°–131° C.; yield= 52%; N (calculated)=4.78%;

N(found)=4.80%

EXAMPLES 2–6

The substitution of cyclobutylamine, n-butylamine, cyclohexylamine, benzylamine or β-phenylisopropylamine for the cyclopropylamine of Example 1 results in the formation of the following products respectively:

N-cyclobutyl-3-phenyl-3-(o-hydroxyphenyl)-2-tetrahydrofuranoneimine melting at 99°–101° C.;

N-n-butyl-3-phenyl-3-(o-hydroxyphenyl-2-tetrahydrofuranoneimine melting at 62°–64° C.;

N-cyclohexyl-3-phenyl-3-(o-hydroxyphenyl)-2-tetrahydrofuranoneimine melting at 107°–108° C.;

N-benzyl-3-phenyl-3-(o-hydroxyphenyl)-2-tetrahydrofuranoneimine melting at 112°–113° C. and N-(β-phenylisopropyl)-3-phenyl-3-(o-hydroxyphenyl)-2-tetrahydrofuranoneimine melting at 177°–178° C.

In a similar manner, the reaction of 3-(β-chloroethyl)-3-phenyl-2-benzofuranone with methylamine, ethylamine, n-propylamine or cyclopentylamine will produce the corresponding N-methyl-, N-ethyl-, N-n-propyl- and N-cyclopentyl-3-phenyl-3-(o-hydroxyphenyl)-2-tetrahydrofuranoneimines.

The 3-(β-chloroethyl)-3-phenyl-2-benzofuranone and 3-(β-bromoethyl)-3-phenyl-2-benzofuranone employed as one of the reactants in the present invention are known compounds and melt at 72.4° C. and 76° C., respectively. Their preparation is described in the Journal of Organic Chemistry, 26; 482 (1961).

What is claimed is:

1. A compound of the formula

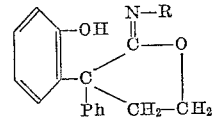

wherein Ph is phenyl and R is a member of the group consisting of loweralkyl, cycloalkyl of from 3 to 6 carbon atoms, inclusive, benzyl and β-phenylisopropyl.

2. N-cyclopropyl-3-phenyl-3(o-hydroxyphenyl)-2-tetrahydrofuranoneimine.

3. N-cyclobutyl-3-phenyl-3-(o-hydroxyphenyl)-2-tetrahydrofuranoneimine.

4. N-n-butyl-3-phenyl-3-(o-hydroxyphenyl)-2-tetrahydrofuranoneimine.

5. N-cyclohexyl-3-phenyl-3-(o-hydroxyphenyl)-2-tetrahydrofuranoneimine.

6. N-benzyl-3-phenyl-3-(o-hydroxyphenyl)-2-tetrahydrofuranoneimine.

7. N-(β-phenylisopropyl)-3-phenyl-3-(o-hydroxyphenyl)-2-tetrahydrofuranoneimine.

8. A method for the preparation of a compound of the formula

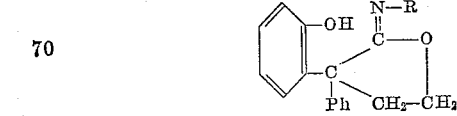

wherein Ph is phenyl and R is a member of the group consisting of loweralkyl, cycloalkyl of from 3 to 6 carbon atoms, inclusive, benzyl and β-phenylisopropyl which comprises reacting at room temperature one molecular proportion of a compound of the formula

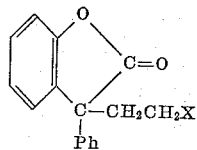

wherein Ph is phenyl and X is a halogen selected from the group consisting of bromine and chlorine with at least two molecular proportions of an amine of the formula R—NH$_2$ wherein R is as previously defined, thereafter filtering the reaction mixture, extracting the filtrate with a dilute aqueous acid solution, making said acid extract alkaline and recovering the solid which precipitates.

9. A method as claimed in claim 8 in which the reaction is carried out in an inert, organic solvent.

10. A method as claimed in claim 9 in which 3-(β-bromoethyl)-3-phenyl-2-benzofuranone is reacted with a cycloalkylamine of from 3 to 6 carbon atoms, inclusive in benzene.

11. A method as claimed in claim 10 in which the amine employed is cyclopropylamine.

12. A method as claimed in claim 10 in which the amine employed is cyclobutylamine.

13. A method as claimed in claim 10 in which the amine employed is cyclohexylamine.

No references cited.